Patented Apr. 13, 1943

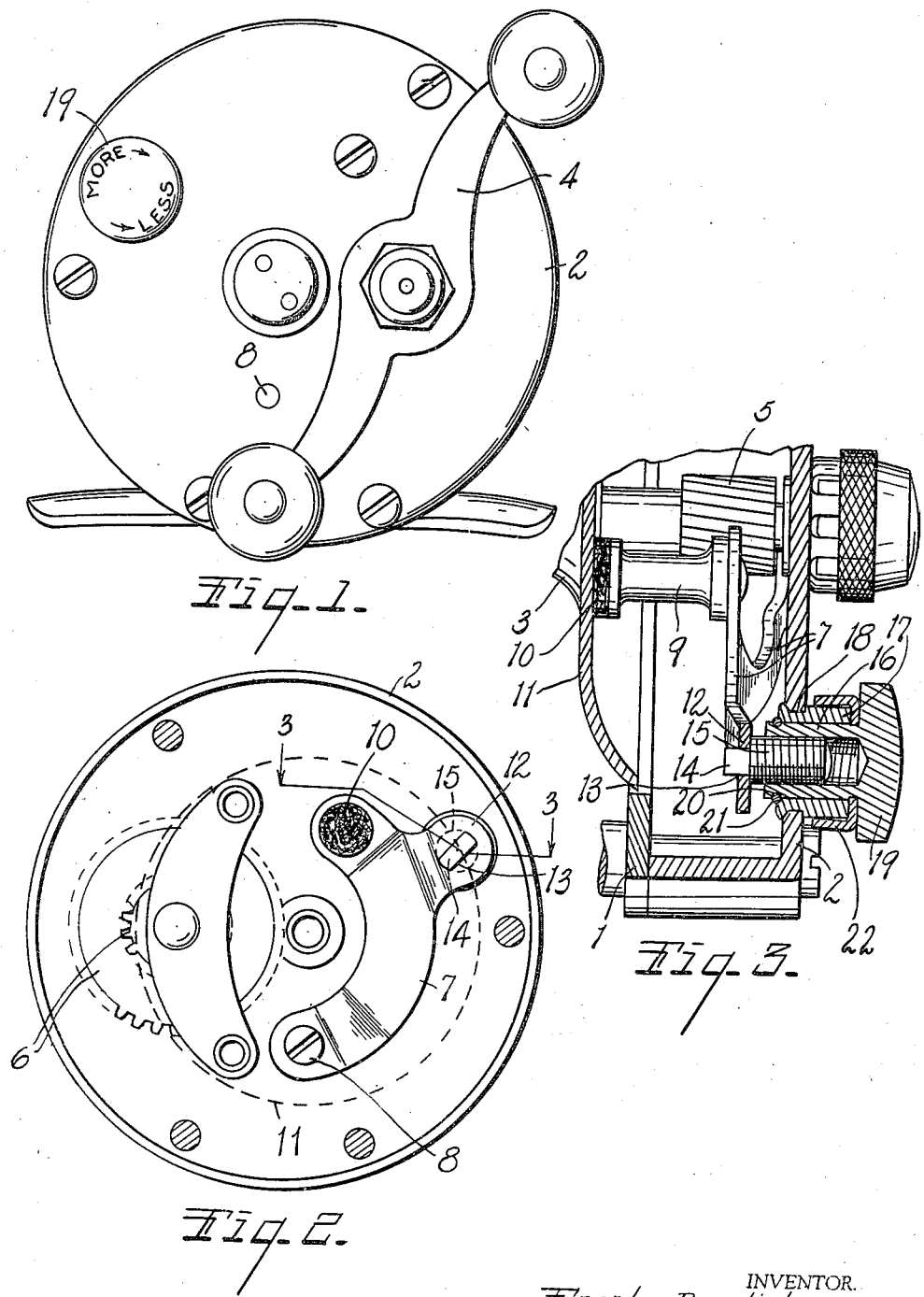

2,316,314

UNITED STATES PATENT OFFICE 2,316,314

FISHING REEL

Frank Burdick, Kalamazoo, Mich., assignor to Shakespeare Company, Kalamazoo, Mich., a corporation of Michigan Application July 15, 1940, Serial No. 345,496

4 Claims. (Cl. 242—84.5)

This invention relates to improvements in fishing reels.

The main objects of this invention are:

First, to provide a fishing reel having an improved casting brake or drag which is very sensitive, that is, very sensitive or fine in its adjustments and at the same time its adjustments are effectively maintained.

Second, to provide in a fishing reel an improved casting brake or drag mechanism which is compact and simple in structure and at the same time highly efficient.

Objects relating to details and economies of the invention will appear from the description to follow. The invention is defined and pointed out in the claims.

A preferred embodiment of the invention is illustrated in the accompanying drawing, in which:

Fig. 1 is a head end elevation of a fishing reel embodying the features of the invention.

Fig. 2 is an inside view of the head plate or cap, the pillars being shown in sections.

Fig. 3 is an enlarged fragmentary view sectioned on the broken line 3—3 of Fig. 2.

Referring to the drawing, the numeral 1 designates the frame of the reel generally. This frame includes the head plate or cap 2 which provides a housing and support for certain of the operative mechanisms including my improved brake mechanism.

The spool 3 is suitably journaled in the frame and is driven from the crank 4, the spool pinion 5 being driven through a train of driving gear 6 indicated by dotted lines in Fig. 2.

My improved brake mechanism comprises the segment-shaped spring brake arm 7 which is fixedly mounted on the inner side of the head plate 2 by means of the screw 8 which is disposed at one end of the brake arm, leaving its other end free for adjustment and it is to be noted that the brake arm has inward offsets which result in its outer end being spaced from the supporting parts for spring action.

At its outer end, the brake arm is provided with an inwardly projecting spool-shaped brake shoe 9 having a friction facing 10 coacting with the adjacent flange 11 of the spool. Adjacent its outer end, the brake arm is provided with a projecting ear 12 having a slot 13 therein receiving the non-circular end 14 of the adjusting stud 15. This adjusting stud is threaded into the cylindrical adjusting member 16 which is rotatably supported in the bushing or bearing 17 riveted into the hole 18 in the head plate.

The adjusting member is provided with a finger piece 19 at its outer end with suitable indicia indicating direction of adjustment to increase or decrease the brake or drag action. The adjusting member has an annular groove 20 at its inner end receiving the split retaining ring 21, as clearly shown in Fig. 3, thereby rotatably retaining the adjusting member 16 and preventing its longitudinal movement.

The operative connection of stud 15 to the spring brake arm by the aforesaid coacting non-circular parts is an extremely simple and effective one. In assembled position, the inherent resilience of brake arm 7 serves to maintain the parts in thrust transmitting relation, acting in the direction away from the spool flange 11. This connection eliminates the need for rivets, screws or the like, and the attendant steps of applying the same, in associating the stud and resilient arm. When the adjusting member 19 is backed off the arm 7 maintains contact therewith so that the parts are at all times ready for actuation in either direction without lost motion.

The friction member 22 is secured to the adjusting member with spring portions engaging the bushing or bearing member 17 for retaining the adjusting member in its adjusted positions. This provides a very simple casting brake or drag mechanism which is easily adjusted to secure the desired amount of drag and the mechanism is capable of very fine or accurate adjustment.

Another feature of very substantial advantage is that the rotatable adjusting member is mounted for rotative movement only; that is, it does not move in and out at all times. In certain structures the brake or drag adjusting means have been threaded into its support so that as it is adjusted it moves in and out and thus varies the clearance of the crank and sometimes becomes a very serious obstacle to convenient manipulation of the reel.

I have illustrated my improvements in a commercial embodiment which I consider highly satisfactory. I have not attempted to illustrate or describe certain other embodiments or adaptations which I contemplate, as it is believed that this disclosure will enable those skilled in the art to embody or adapt my improvements as may be desired.

Having thus described my invention, what I claim as new and desire to secure by Letters Patent, is:

1. In a fishing reel, the combination with a frame including a removable head plate, a spool, a segmentally curved spring brake arm generally concentric with the spool secured at one end to said head plate and provided with a radially outwardly projecting ear adjacent its other end, a brake shoe on said other end of said brake arm coacting with said spool, a tubular bearing member projecting from said head plate, an adjusting member rotatable in said bearing and provided with a finger piece on one side of said head plate and an annular groove on the other side of the plate, a split retaining ring engaging said groove and coacting with said bearing member for rotatably retaining said adjusting member, and a stud threadedly engaging said adjusting member and having thrust engagement with said ear on said brake arm and provided with a flattened end engaging an elongated opening therein whereby the stud is supported against rotative movement.

2. In a fishing reel, the combination with a frame including a removable head plate, a spool, a segmentally curved spring brake arm generally concentric with the spool secured at one end to said head plate and provided with a radially outwardly projecting ear adjacent its other end, a brake shoe on said other end of said brake arm coacting with said spool, a tubular bearing member projecting from said head plate, an adjusting member rotatable in said bearing and provided with a finger piece, and a stud threadedly engaging said adjusting member and having thrust engagement with said ear on said brake arm and provided with a flattened end engaging an elongated opening therein whereby the stud is supported against rotative movement, said adjusting member having means thereon coacting with said bearing member to maintain the adjusted setting of the brake arm.

3. In a fishing reel, the combination with a frame, a spool, a segmentally curved spring brake arm generally concentric with the spool secured at one end to said frame and provided with a radially outwardly projecting ear adjacent its other end, a brake shoe on said other end of said brake arm coacting with said spool, an adjusting member rotatably mounted on said frame and provided with a finger piece, and a stud threadedly engaging said adjusting member and having thrust engagement with said ear on said brake arm and provided with a flattened end engaging an elongated opening therein whereby the stud is supported against rotative movement.

4. In a fishing reel, the combination of a frame rotatably journaling a spool and including a bearing plate, a resilient leaf spring brake arm secured at one end to said plate and provided at the other end with a brake shoe frictionally engageable with said spool, said arm being normally biased to withdraw the shoe from the spool, an adjusting member rotatably mounted in said plate and restrained from axial movement thereon, a stud threadedly engageable with said member having a non-circular portion thereon, said arm having a radially outwardly offset ear intermediate the ends thereof provided with a non-circular opening removably and non-rotatively engaging said non-circular stud portion, and the stud being maintained in thrust transmitting relation to the arm solely by the resilience of the latter, rotative adjustment of said adjusting member resulting in movement of the stud and arm in opposition to the resilience of the latter to frictionally apply the shoe to the spool.

FRANK BURDICK.